United States Patent
Kou et al.

(10) Patent No.: US 12,017,956 B1
(45) Date of Patent: Jun. 25, 2024

(54) METHOD FOR PREPARING BITTERN-CARBONIZATION SYNERGISTIC REINFORCED RECYCLED AGGREGATE

(71) Applicant: Yangzhou University, Jiangsu (CN)

(72) Inventors: Changjiang Kou, Jiangsu (CN); Jiyang Sun, Jiangsu (CN); Zhiwei Sun, Jiangsu (CN); Yu Lu, Jiangsu (CN); Rongxue Fan, Jiangsu (CN); Peng Xiao, Jiangsu (CN); Aihong Kang, Jiangsu (CN); Zhengguang Wu, Jiangsu (CN)

(73) Assignee: Yangzhou University, Yangzhou (CN)

( * ) Notice: Subject to any disclaimer, the term of this patent is extended or adjusted under 35 U.S.C. 154(b) by 0 days.

(21) Appl. No.: 18/585,108

(22) Filed: Feb. 23, 2024

(30) Foreign Application Priority Data

Apr. 23, 2023 (CN) .......................... 202310442902.X

(51) Int. Cl.
 *C04B 20/10* (2006.01)
 *C04B 18/167* (2023.01)

(52) U.S. Cl.
 CPC ........ *C04B 20/1066* (2013.01); *C04B 18/167* (2013.01)

(58) Field of Classification Search
 CPC .................... C04B 20/1066; C04B 18/167
 See application file for complete search history.

(56) References Cited

FOREIGN PATENT DOCUMENTS

| CN | 1159423 A | 9/1997 |
|---|---|---|
| CN | 102795646 A | 11/2012 |
| CN | 105174766 A | 12/2015 |
| CN | 105884230 A | 8/2016 |
| CN | 108203253 A | 6/2018 |
| JP | 2005041750 A | 2/2005 |
| JP | 2006240236 A | 9/2006 |
| KR | 20110084811 A | 7/2011 |
| KR | 20130109616 A | 10/2013 |

*Primary Examiner* — Anthony J Green

(57) ABSTRACT

Disclosed is a method for preparing bittern-carbonization synergistic reinforced recycled aggregate, including the following steps: spray pretreatment: performing alternate spraying on recycled aggregate with bittern and lime milk at intervals for many times at 4-70° C. and a pressure of 0.05-0.6 MPa; carbonization reinforcement: introducing waste gas containing carbon dioxide for a retention time of 4-8 h after the recycled aggregate is allowed to stand for 2-4 h; and rinsing and air drying: removing soluble impurities on a surface of the recycled aggregate by rinsing in water, and performing air-drying on the recycled aggregate to obtain bittern-carbonization synergistic reinforced recycled aggregate. According to the present disclosure, the effective reinforcement of recycled aggregate at normal temperature and pressure in a short time is realized, and the method is simple in process and is convenient in operation.

9 Claims, 2 Drawing Sheets

METHOD FOR PREPARING BITTERN-CARBONIZATION SYNERGISTIC REINFORCED RECYCLED AGGREGATE

CROSS-REFERENCE TO RELATED APPLICATIONS

This application claims priority of Chinese Patent Application No. 202310442902.X, filed on Apr. 23, 2023, the entire contents of which are incorporated herein by reference.

TECHNICAL FIELD

The present disclosure relates to aggregate reinforcing methods, in particular to a method for preparing bittern-carbonization synergistic reinforced recycled aggregate.

BACKGROUND

In recent years, the stock and discharge of construction solid waste, especially waste concrete, are increasing year by year, and the existing stock of construction solid waste reaches tens of billions of tons. The waste concrete accounts for 41% of the total construction solid waste. At the same time, the problem of construction sand shortage is becoming more and more serious. An inevitable trend of the green development of the construction industry in the future is to produce recycled aggregate by using waste concrete, to be used as construction sand, which can not only realize the rapid consumption of construction solid waste, but also alleviate the pressure on the construction sand market.

Compared with natural aggregate, it is found that the recycled aggregate has high mud content, low strength, and high porosity, leading to high water absorption and limited application range. The use of carbon dioxide reinforced recycled aggregate can not only improve the quality of recycled aggregate and its performance, but also reduce the emission of carbon dioxide, save resources and protect the environment, which has broad application and development prospects.

Bittern is a waste by-product from salt industry and seawater treatment. As a big country with marine resources, the annual output of bittern in China has reached 20 million $m^3$. Bittern is a liquid mineral resource which is rich and sustainable to develop and utilize. Bittern is low-cost, green and environmental friendly, and contains abundant metal mineral components, in which the content of magnesium is more than 10%. However, due to the limitation of technical level, the utilization rate is still less than 20%. Most of magnesium is not utilized well, which has great development and utilization value and potential.

The existing method for carbon dioxide reinforced recycled aggregate still has the following problems.

The recycled aggregate is reinforced by using carbon dioxide to cause carbon dioxide to react with effective components, such as calcium hydroxide in the aged mortar on a surface layer of recycled aggregate and C—S—H gel to generate strength substances such as calcium carbonate and silica gel, to fill pores and cracks in the aged mortar on the surface layer to improve the performance of recycled aggregate. However, at a low treatment level with a lower pressure, a shorter time and a low concentration of carbon dioxide, the progress of the carbonization of recycled aggregate is slow, with poor effect. At a high treatment level with a higher pressure, a longer time and a high concentration of carbon dioxide, although the performance of recycled aggregate is significantly improved, the cost is higher, which is not conducive to industrial continuous production.

Therefore, in order to solve the contradiction between reinforcing effect and treatment level of carbonization reinforced recycled aggregate, it is necessary to study a carbonization reinforced recycled aggregate method which is environmental friendly and can effectively improve the quality of recycled aggregate at a low treatment level with a normal temperature and pressure, a short time and direct utilization of waste gas containing a low concentration of carbon dioxide.

SUMMARY

An object of the present disclosure is to provide a low-cost and environmental friendly method for preparing bittern-carbonization synergistic reinforced recycled aggregate to overcome the disadvantages of the prior art.

Technical solutions are as follows. The present disclosure provides a method for preparing bittern-carbonization synergistic reinforced recycled aggregate, including the following steps:

(1) spray pretreatment: performing alternate spraying on recycled aggregate with bittern and lime milk at intervals for many times at 4-70° C. and a pressure of 0.05-0.6 MPa until a surface of the recycled aggregate is wet;

(2) carbonization reinforcement: introducing waste gas containing carbon dioxide for a retention time of 4-8 h after the recycled aggregate is allowed to stand for 2-4 h; and (3) rinsing and air drying: removing soluble impurities on the surface of the recycled aggregate by rinsing in water, and performing air-drying on the recycled aggregate to obtain bittern-carbonization synergistic reinforced recycled aggregate.

Further, in step (1), the recycled aggregate is a low-quality recycled coarse aggregate with a water-cement ratio of primary concrete of 0.3-0.45 and a particle size of 5-20 mm. A concentration of magnesium ions in bittern is ≥2.3 mol/L. Preferably, a concentration of magnesium ions in bittern is 2.9-3.5 mol/L. When the concentration of magnesium ions in bittern is less than 2.3 mol/L, the concentration of magnesium ions is too low to react with calcium hydroxide sufficiently, resulting in a large residual amount of calcium hydroxide not involved in the reaction. The lime milk is a calcium hydroxide suspension, a mass percentage of calcium hydroxide being 40%-60%. A volume ratio of bittern to lime milk is 25:1-35:1, and the lime milk is sprayed at intervals of 10-30 min after the bittern is sprayed every time. The alternate spraying is performed at intervals of 1-4 h for 2-4 times. When an interval time is less than 10 min, it is difficult for bittern to fully permeate pores and micro-cracks of the aged mortar on a surface layer of recycled aggregate, easily resulting in undesirable reinforcing effect of the deep structure of aged mortar.

Further, in step (2), a volume fraction of carbon dioxide in the waste gas is 10-20%. If the volume fraction of carbon dioxide in the waste gas is less than 10%, the time required for carbonization reinforcement is greatly prolonged to achieve the reinforcing effect, but the reinforcing effect is not good. If the volume fraction of carbon dioxide in the waste gas is more than 20%, the volume fraction of carbon dioxide continues to increase due to the limited solubility of carbon dioxide gas, but the reinforcing effect is reduced instead of being improved, and a carbonization time is difficult to be shortened. Preferably, a volume fraction of carbon dioxide in the waste gas is 15-20%.

Further, in step (3), the rinsing is performed for 30 min-1 h. A by-product, calcium chloride, is easily soluble in water. A content of calcium chloride is not high and most of calcium chloride remains on the surface of recycled aggregate. So the calcium chloride can be basically removed by rinsing. The rinsing is simple in process, low in cost and widely applied in industrial production practice.

Principles of preparation are as follows. Magnesium contained in bittern usually exists in the form of magnesium chloride hexahydrate, which can react with the aged mortar of the surface layer of recycled aggregate and calcium hydroxide in lime milk to generate calcium chloride dihydrate and magnesium hydroxide, which remain in the pores and micro-cracks of the aged mortar due to capillary effect. After carbon dioxide is introduced, bicarbonate ions and carbonate ions generated by the water dissolved in the pores and micro-cracks of the aged mortar by the carbon dioxide, react with calcium chloride dihydrate under the condition of carbonization to generate particulate calcium carbonate to fill the pores and micro-cracks, and generate carbon dioxide. The carbon dioxide and the carbonate ions in the solution further react with effective components, such as calcium hydroxide in lime milk and calcium hydroxide in the aged mortar, and C—S—H gel, and the previously generated calcium carbonate particulates are served as nucleating points to generate strength substances such as calcium carbonate and silica gel, so that the particulate calcium carbonate continuously develops and gradually fill the pores and micro-cracks to make the microstructure of the aged mortar on the surface of recycled aggregate more compact, thereby improving the performance of recycled aggregate. Since bittern and by-product magnesium hydroxide are alkaline, the solubility of carbon dioxide is increased and the reaction is further promoted. Since the by-product calcium chloride is easily soluble in water, the content of calcium chloride is not high and most of calcium chloride remains on the surface of recycled aggregate, so the calcium chloride can be basically removed by rinsing.

In the spray pretreatment stage, by controlling the number of spray treatments, a time interval of the spray treatment, a time interval between bittern and lime milk in each spray treatment, and a volume ratio of bittern to lime milk, the effective components in bittern and lime milk can be fully involved in the reaction, and fully permeate the pores and micro-cracks of the aged mortar on the surface layer of recycled aggregate. In the carbonization reinforcing stage, the volume fraction of carbon dioxide and the carbonization time mainly affect the formation and development of particulate calcium carbonate. If the volume fraction of carbon dioxide is too low or the carbonization time is too short, the formation of particulate calcium carbonate is less and the development is slow; and if the volume fraction of carbon dioxide is too high, large-diameter calcium carbonate whiskers are easily generated, and the pores and micro-cracks on a surface layer of the aged mortar are blocked, resulting in poor reinforcing effect of the deep structure of aged mortar. Therefore, the reinforcing effect of the recycled aggregate can be sufficiently ensured only under the synergistic effect of parameter range conditions given in the present disclosure.

The equations involved are as follows:

$$Ca(OH)_2 + MgCl_2 \cdot 6H_2O = Mg(OH)_2 \downarrow + CaCl_2 \cdot 2H_2O + 4H_2O$$

-continued $$CO_2 + H_2O \rightarrow H_2CO_3 \rightarrow HCO_3^- \rightarrow CO_3^{2-}$$

$$2HCO_3^- + CaCl_2 \cdot 2H_2O \xrightarrow{CO_2} CaCO_3 \downarrow (particulates) + 3H_2O + CO_2 \uparrow + 2Cl^-$$

$$CO_2 + Ca(OH)_2 = CaCO_3 \downarrow + H_2O$$

$$CO_2 + C\text{—}S\text{—}H \rightarrow CaCO_3 + SiO_2 \cdot nH_2O$$

Advantageous effects are as follows. Compared with the prior art, the present disclosure has the following significant features.

1. The method for preparing bittern-carbonization synergistic reinforced recycled aggregate has low requirements on temperature, pressure, treatment time and carbon dioxide concentration in waste gas, and the effective reinforcement of recycled aggregate is realized at normal temperature and pressure, a short time and direct utilization of waste gas containing a low concentration of carbon dioxide. The present disclosure has the advantages of simple process, convenient operation and easily available raw materials, which is conducive to reduce production cost and realize industrial continuous production.

2. An apparent density of recycled aggregate can be effectively increased, a water absorption and a crushing value of recycled aggregate are reduced, and the quality of recycled aggregate is improved, which is conducive to expand the scope of application of recycled aggregate and realize the reuse of construction waste resources.

3. The industrial waste gas can be effectively utilized to reinforce the recycled aggregate, the emission of carbon dioxide waste gas and the use of natural aggregate are reduced, the waste gas discharged from the recycled aggregate is treated, and the waste material does not contain harmful substances, which is conducive to the recycling of industrial and construction waste and resource conservation, and is green and environmental friendly.

4. The application potential of bittern, a waste product of salt industry and seawater treatment, in the field of construction solid waste resource utilization is explored, which can effectively improve the utilization efficiency of bittern resources and is conducive to realize the comprehensive utilization of resources.

The method is simple in process, low in cost, green and environmental friendly, and is conducive to continuous industrial production. It can not only effectively utilize solid construction waste and waste products from salt industry and seawater treatment, but also effectively improve the performance of recycled aggregate at normal temperature and pressure, a short time and direct utilization of waste gas containing a low concentration of carbon dioxide.

DETAILED DESCRIPTION

In the following examples, bittern is selected from Guandong Salt Field in Yancheng City. Waste gas is a mixed gas of air and carbon dioxide in different proportions prepared in laboratory to simulate waste gas containing carbon dioxide.

Example 1

A method for preparing bittern-carbonization synergistic reinforced recycled aggregate included the following steps.

At (1): a primary mortar test block with a water-cement ratio of 0.35 was used, and the crushing production of recycled aggregate was performed by a jaw crusher. After being screened, the recycled aggregate with a particle size of 9.5-13.2 mm was selected for washing, and impurities such as dust on the surface were removed to obtain clean low-quality recycled coarse aggregate. A concentration of magnesium ions in bittern was 2.942 mol/L. Lime milk was a calcium hydroxide suspension prepared from quicklime and water, a mass percentage of calcium hydroxide being 50 wt %. Testing recycled aggregate had an initial apparent density of 2534 kg/m$^3$, a water absorption of 7.835% and a crushing value of 28.86%, as detailed in Table 1 below.

At (2): spray pretreatment: the alternate spraying was performed on the recycled aggregate with bittern and lime milk at intervals for 4 times at 25° C. and a pressure of 0.1 MPa, with an interval of 2 h between spray treatments, until the surface of the recycled aggregate was wet; and each spray treatment included one spray of bittern and one spray of lime milk, and the lime milk was sprayed at an interval of 10 min after the bittern was sprayed every time. A volume ratio of bittern to lime milk was 35:1.

At (3): carbonization reinforcing: waste gas containing 15 vol % of carbon dioxide was introduced for a retention time of 6 h after the recycled aggregate was allowed to stand for 2 h at the same temperature and pressure as in step (2).

At (4): rinsing and air drying: soluble impurities on the surface of the recycled aggregate were removed by rinsing in water for 1 h, and the recycled aggregate was air-dried to obtain bittern-carbonization synergistic reinforced recycled aggregate.

Figure 1A:
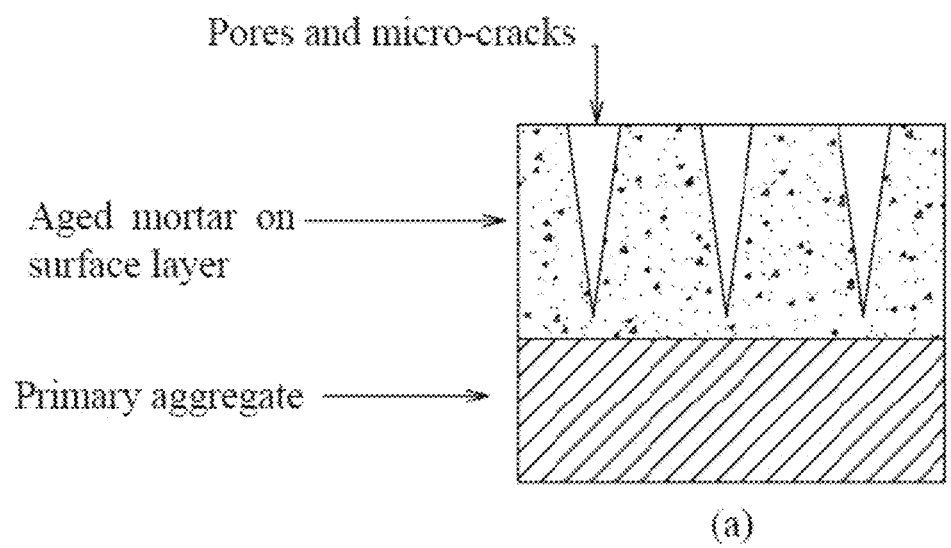
FIG. 1(a) is a schematic diagram of the micro-morphology change of primary recycled aggregate according to the present disclosure.
Figure 1B:
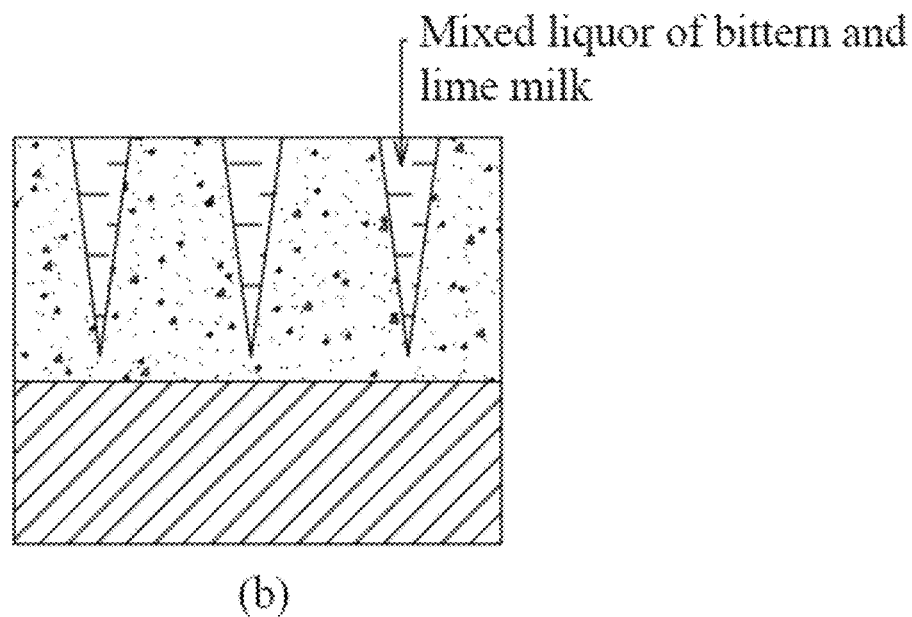
FIG. 1(b) is a schematic diagram of the micro-morphology change of recycled aggregate after spray pretreatment according to the present disclosure.
Figure 1C:
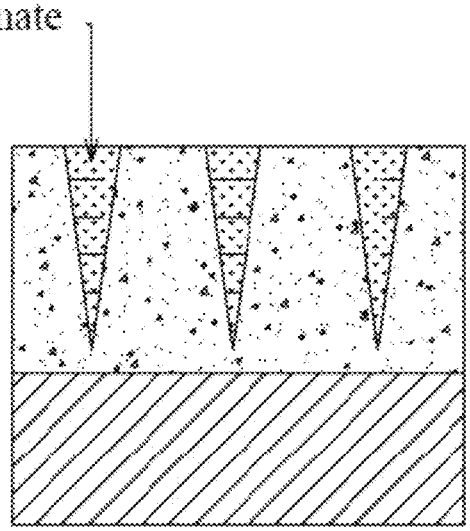
FIG. 1(c) is a schematic diagram of the micro-morphology change of recycled aggregate in carbonization reinforcing according to the present disclosure.
Figure 1D:
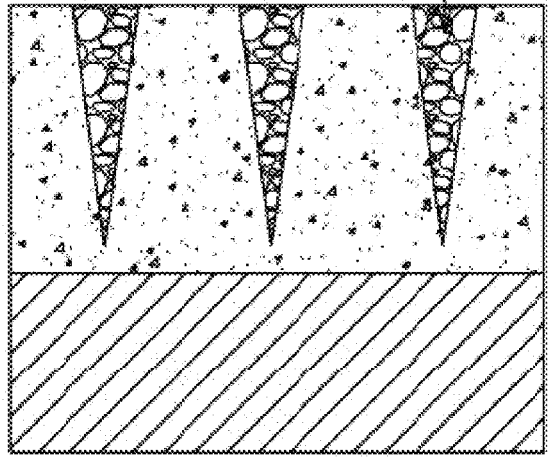
FIG. 1(d) is a schematic diagram of the micro-morphology change of recycled aggregate after carbonation reinforcing according to the present disclosure.

The micro-morphology characteristics of the reinforced recycled aggregate were shown in FIG. 1. The main reasons for the poor quality of recycled aggregate were that: compared with the natural aggregate, different degrees of damage cracks could be formed in the interior and surface of the recycled aggregate due to mechanical damage and damage accumulation, and residual mortar with a loose texture was attached on the exterior surface, as shown in FIG. 1(a). During the preparation of the reinforced recycled aggregate, the mixed liquor of bittern and lime milk could fully permeated pores and micro-cracks of the aged mortar on the surface layer of recycled aggregate by spray pretreatment, as shown in FIG. 1(b). Through carbonization reinforcing, abundant calcium carbonate particulates were generated in the pores and micro-cracks of the aged mortar, initially filling the pores and micro-cracks of the aged mortar, as shown in FIG. 1(c). With the proceeding of carbonization reinforcing, the particulate calcium carbonate continuously developed and gradually filled the pores and micro-cracks to make the microstructure of the aged mortar on the surface of the recycled aggregate more compact, thereby improving the performance of the recycled aggregate, as shown in FIG. 1(d).

The apparent density of reinforced recycled aggregate obtained in the example was tested according to "Test Methods of Aggregate for Highway Engineering" (JTG E42-2005), which was increased by 1.28% compared with that before reinforcing. The water absorption of reinforced recycled aggregate was tested, which was decreased by 27.13% compared with that before reinforcing. The crushing value of reinforced recycled aggregate was tested, which was decreased by 24.71% compared with that before reinforcing.

Example 2

A method for preparing bittern-carbonization synergistic reinforced recycled aggregate included the following steps.

At (1): a primary mortar test block with a water-cement ratio of 0.35 was used, and the crushing production of recycled aggregate was performed by a jaw crusher. After being screened, the recycled aggregate with a particle size of 9.5-13.2 mm was selected for washing, and impurities such as dust on the surface were removed to obtain clean low-quality recycled coarse aggregate. A concentration of magnesium ions in bittern was 2.942 mol/L. Lime milk was a calcium hydroxide suspension prepared from quicklime and water, a mass percentage of calcium hydroxide being 50 wt %.

At (2): spray pretreatment: the alternate spraying was performed on the recycled aggregate with bittern and lime milk at intervals for 3 times at 25° C. and a pressure of 0.1 MPa, with an interval of 3 h between spray treatments, until the surface of the recycled aggregate was wet; and each spray treatment included one spray of bittern and one spray of lime milk, and the lime milk was sprayed at an interval of 20 min after the bittern was sprayed every time. A volume ratio of bittern to lime milk was 30:1.

At (3): carbonization reinforcing: waste gas containing 15 vol % of carbon dioxide was introduced for a retention time of 6 h after the recycled aggregate was allowed to stand for 3 h at the same temperature and pressure as in step (2).

At (4): rinsing and air drying: soluble impurities on the surface of the recycled aggregate were removed by rinsing in water for 1 h, and the recycled aggregate was air-dried to obtain bittern-carbonization synergistic reinforced recycled aggregate.

An apparent density of reinforced recycled aggregate obtained in the example was tested according to "Test Methods of Aggregate for Highway Engineering" (JTG E42-2005), which was increased by 1.53% compared with that before reinforcing. A water absorption of reinforced recycled aggregate was tested, which was decreased by 33.90% compared with that before reinforcing. A crushing value of reinforced recycled aggregate was tested, which was decreased by 28.25% compared with that before reinforcing.

Example 3

A method for preparing bittern-carbonization synergistic reinforced recycled aggregate included the following steps.

At (1): a primary mortar test block with a water-cement ratio of 0.35 was used, and the crushing production of recycled aggregate was performed by a jaw crusher. After being screened, the recycled aggregate with a particle size of 9.5-13.2 mm was selected for washing, and impurities such as dust on the surface were removed to obtain clean low-quality recycled coarse aggregate. A concentration of magnesium ions in bittern was 2.942 mol/L. Lime milk was a calcium hydroxide suspension prepared from quicklime and water, a mass percentage of calcium hydroxide being 50 wt %.

At (2): spray pretreatment: the alternate spraying was performed on the recycled aggregate with bittern and lime milk at intervals for 2 times at 25° C. and a pressure of 0.1 MPa, with an interval of 4 h between spray treatments, until the surface of the recycled aggregate was wet; and each spray treatment included one spray of bittern and one spray of lime milk, and the lime milk was sprayed at an interval of 30 min after the bittern was sprayed every time. A volume ratio of bittern to lime milk was 25:1.

At (3): carbonization reinforcing: waste gas containing 15 vol % of carbon dioxide was introduced for a retention time of 6 h after the recycled aggregate was allowed to stand for 4 h at the same temperature and pressure as in step (2).

At (4): rinsing and air drying: soluble impurities on the surface of the recycled aggregate were removed by rinsing in water for 1 h, and the recycled aggregate was air-dried to obtain bittern-carbonization synergistic reinforced recycled aggregate.

An apparent density of reinforced recycled aggregate obtained in the example was tested according to "Test Methods of Aggregate for Highway Engineering" (JTG E42-2005), which was increased by 1.39% compared with that before reinforcing. A water absorption of reinforced recycled aggregate was tested, which was decreased by 31.75% compared with that before reinforcing. A crushing value of reinforced recycled aggregate was tested, which was decreased by 27.12% compared with that before reinforcing.

Example 4

A method for preparing bittern-carbonization synergistic reinforced recycled aggregate included the following steps.

At (1): a primary mortar test block with a water-cement ratio of 0.3 was used, and the crushing production of recycled aggregate was performed by a jaw crusher. After being screened, the recycled aggregate with a particle size of 5-20 mm was selected for washing, and impurities such as dust on the surface were removed to obtain clean low-quality recycled coarse aggregate. A concentration of magnesium ions in bittern was 3.506 mol/L. Lime milk was a calcium hydroxide suspension prepared from quicklime and water, a mass percentage of calcium hydroxide being 40 wt %.

At (2): spray pretreatment: the alternate spraying was performed on the recycled aggregate with bittern and lime milk at intervals for 2 times at 4° C. and a pressure of 0.05 MPa, with an interval of 4 h between spray treatments, until the surface of the recycled aggregate was wet; and each spray treatment included one spray of bittern and one spray of lime milk, and the lime milk was sprayed at an interval of 15 min after the bittern was sprayed every time. A volume ratio of bittern to lime milk was 28:1.

At (3): carbonization reinforcing: waste gas containing 20 vol % of carbon dioxide was introduced for a retention time of 4 h after the recycled aggregate was allowed to stand for 3 h at the same temperature and pressure as in step (2).

At (4): rinsing and air drying: soluble impurities on the surface of the recycled aggregate were removed by rinsing in water for 30 min, and the recycled aggregate was air-dried to obtain bittern-carbonization synergistic reinforced recycled aggregate.

An apparent density of reinforced recycled aggregate obtained in the example was tested according to "Test Methods of Aggregate for Highway Engineering" (JTG E42-2005), which was increased by 1.66% compared with that before reinforcing. A water absorption of reinforced recycled aggregate was tested, which was decreased by 36.12% compared with that before reinforcing. A crushing value of reinforced recycled aggregate was tested, which was decreased by 30.08% compared with that before reinforcing.

Example 5

A method for preparing bittern-carbonization synergistic reinforced recycled aggregate included the following steps.

At (1): a primary mortar test block with a water-cement ratio of 0.45 was used, and the crushing production of recycled aggregate was performed by a jaw crusher. After being screened, the recycled aggregate with a particle size of 8-16 mm was selected for washing, and impurities such as dust on the surface were removed to obtain clean low-quality recycled coarse aggregate. A concentration of magnesium ions in bittern was 2.349 mol/L. Lime milk was a calcium hydroxide suspension prepared from quicklime and water, a mass percentage of calcium hydroxide being 60 wt %.

At (2): spray pretreatment: the alternate spraying was performed on the recycled aggregate with bittern and lime milk at intervals for 4 times at 70° C. and a pressure of 0.6 MPa, with an interval of 1 h between spray treatments, until the surface of the recycled aggregate was wet; and each spray treatment included one spray of bittern and one spray of lime milk, and the lime milk was sprayed at an interval of 25 min after the bittern was sprayed every time. A volume ratio of bittern to lime milk was 33:1.

At (3): carbonization reinforcing: waste gas containing 10 vol % of carbon dioxide was introduced for a retention time of 8 h after the recycled aggregate was allowed to stand for 4 h at the same temperature and pressure as in step (2).

At (4): rinsing and air drying: soluble impurities on the surface of the recycled aggregate were removed by rinsing in water for 45 min, and the recycled aggregate was air-dried to obtain bittern-carbonization synergistic reinforced recycled aggregate.

An apparent density of reinforced recycled aggregate obtained in the example was tested according to "Test Methods of Aggregate for Highway Engineering" (JTG E42-2005), which was increased by 1.18% compared with that before reinforcing. A water absorption of reinforced recycled aggregate was tested, which was decreased by 26.23% compared with that before reinforcing. A crushing value of reinforced recycled aggregate was tested, which was decreased by 24.08% compared with that before reinforcing.

Comparative Example 1

Recycled aggregate in Comparative Example 1 was the same as the recycled aggregate used in steps (1) of Examples 1 to 3, an apparent density, a water absorption and a crushing value of unreinforced primary recycled aggregate were tested.

Comparative Example 2

The remaining steps of Comparative Example 2 were the same as those of Example 1, and the only difference was that: in step (2), the number of spray treatments, an interval time, and a spraying interval time and a volume ratio of bittern and lime milk in each spray treatment were different.

At the spray pretreatment step in Comparative Example 2, the recycled aggregate was sprayed for 6 times at 25° C. and a pressure of 0.1 MPa, with an interval of 1 h between spray treatments, until the surface of the recycled aggregate was wet. Each spray treatment included one spray of bittern and one spray of lime milk, and the lime milk was sprayed at an interval of 10 min after the bittern was sprayed every time. A volume ratio of bittern to lime milk for each spraying was 40:1.

An apparent density of reinforced recycled aggregate was tested, which was increased by 0.31% compared with that before reinforcing. A water absorption of reinforced recycled aggregate was tested, which was decreased by 15.27% compared with that before reinforcing. A crushing value of reinforced recycled aggregate was tested, which was decreased by 10.66% compared with that before reinforcing.

Comparative Example 3

The remaining steps of Comparative Example 3 were the same as those of Example 2, and the only difference was that: in step (2), the number of spray treatments, an interval time, and a spraying interval time and a volume ratio of bittern and lime milk in each spray treatment were different.

At the spray pretreatment step in Comparative Example 3, the recycled aggregate was sprayed for 5 times at 25° C. and a pressure of 0.1 MPa, with an interval of 3 h between spray treatments, until the surface of the recycled aggregate was wet. Each spray treatment included one spray of bittern and one spray of lime milk, and the lime milk was sprayed at an interval of 20 min after the bittern was sprayed every time. A volume ratio of bittern to lime milk for each spraying was 30:1.

An apparent density of reinforced recycled aggregate was tested, which was increased by 1.55% compared with that before reinforcing. A water absorption of reinforced recycled aggregate was tested, which was decreased by 35.08% compared with that before reinforcing. A crushing value of reinforced recycled aggregate was tested, which was decreased by 28.92% compared with that before reinforcing.

Comparative Example 4

The remaining steps of Comparative Example 4 were the same as those of Example 3, and the only difference was that: in step (2), the number of spray treatments, an interval time, and a spraying interval time and a volume ratio of bittern and lime milk in each spray treatment were different.

At the spray pretreatment step in Comparative Example 4, the recycled aggregate was sprayed for 1 time at normal temperature and pressure until the surface of the recycled aggregate was wet. The spray treatment included one spray of bittern and one spray of lime milk, and the lime milk was sprayed at an interval of 30 min after the bittern was sprayed every time. A volume ratio of bittern to lime milk for each spraying was 25:1.

An apparent density of reinforced recycled aggregate was tested, which was increased by 0.17% compared with that before reinforcing. A water absorption of reinforced recycled aggregate was tested, which was decreased by 8.43% compared with that before reinforcing. A crushing value of reinforced recycled aggregate was tested, which was decreased by 4.51% compared with that before reinforcing.

Comparative Example 5

The remaining steps of Comparative Example 5 were the same as those of Example 1, and the only difference was that: in step (3), a volume fraction of carbon dioxide in a carbon dioxide-containing gas introduced and a retention time were different.

In Comparative Example 5, carbon dioxide gas with a volume fraction of 5% was introduced for a retention time of 8 h to obtain bittern-treated carbonization reinforced recycled aggregate.

An apparent density of reinforced recycled aggregate was tested, which was increased by 0.39% compared with that before reinforcing. A water absorption of reinforced recycled aggregate was tested, which was decreased by 12.80% compared with that before reinforcing. A crushing value of reinforced recycled aggregate was tested, which was decreased by 9.53% compared with that before reinforcing.

Comparative Example 6

The remaining steps of Comparative Example 6 were the same as those of Example 3, and the only difference was that: in step (3), a volume fraction of carbon dioxide in a carbon dioxide-containing gas introduced and a retention time were different.

In Comparative Example 6, carbon dioxide gas with a volume fraction of 25% was introduced for a retention time of 4 h to obtain bittern-treated carbonization reinforced recycled aggregate.

An apparent density of reinforced recycled aggregate was tested, which was increased by 1.47% compared with that before reinforcing. A water absorption of reinforced recycled aggregate was tested, which was decreased by 32.18% compared with that before reinforcing. A crushing value of reinforced recycled aggregate was tested, which was decreased by 29.09% compared with that before reinforcing.

Comparative Example 7

In Comparative Example 7, the same recycled aggregate as in Examples 1 to 3 was selected for an accelerated carbonization test in a carbonization tank. At present, the solution of the accelerated carbonization reinforced recycled aggregate with better reinforcing effect in the available information was that: a concentration of carbon dioxide gas in the carbonization tank was 100%, a temperature was (25±2)° C., a pressure was 0.4 MPa, and a relative humidity was (70±5)%, and the accelerated carbonization reinforced recycled aggregate was obtained after 7 d.

An apparent density of reinforced recycled aggregate was tested, which was increased by 0.63% compared with that before reinforcing. A water absorption of reinforced recycled aggregate was tested, which was decreased by 26.35% compared with that before reinforcing. A crushing value of reinforced recycled aggregate was tested, which was decreased by 25.81% compared with that before reinforcing.

In order to comprehensively investigate the reinforcing effect of the method for bittern-carbonization synergistic reinforced recycled aggregate on the performance of recycled aggregate, in the present disclosure, the apparent densities, water absorptions and crushing values of the samples of primary recycled aggregate (Comparative Example 1), reinforced recycled aggregate in Examples 1-3 and reinforced recycled aggregate in Comparative Examples 2-7 were tested according to "Test Methods of Aggregate for Highway Engineering" (JTG E42-2005), and the results were shown in Table 1.

TABLE 1

Properties of recycled aggregate after carbonization reinforcing

| Sample | Apparent density of recycled aggregate (kg/m³) | Water absorption of recycled aggregate (%) | Crushing value of recycled aggregate (%) |
|---|---|---|---|
| Example 1 | 2566 | 5.709 | 21.73 |
| Example 2 | 2573 | 5.179 | 20.71 |
| Example 3 | 2569 | 5.347 | 21.03 |
| Example 4 | 2576 | 5.005 | 20.18 |
| Example 5 | 2564 | 5.781 | 21.91 |
| Comparative Example 1 | 2534 | 7.835 | 28.86 |
| Comparative Example 2 | 2538 | 6.639 | 25.78 |
| Comparative Example 3 | 2573 | 5.086 | 20.51 |
| Comparative Example 4 | 2542 | 7.175 | 27.56 |
| Comparative Example 5 | 2544 | 6.832 | 26.11 |
| Comparative Example 6 | 2571 | 5.314 | 20.46 |
| Comparative Example 7 | 2550 | 5.771 | 21.41 |

As could be seen from Examples 1 to 5 and Comparative Example 1 in Table 1, the reinforced recycled aggregate prepared in the present disclosure had an increased apparent density and significantly reduced water absorption and crushing value compared with that before reinforcing. This was because magnesium chloride hexahydrate in bittern could undergo a series of reactions with the aged mortar on the surface layer of recycled aggregate, calcium hydroxide in lime milk and carbon dioxide to generate particulate calcium carbonate to fill the pores and micro-cracks in the aged mortar, and at the same time, carbon dioxide and carbonate ions in the pore and micro-crack solution further reacted with effective components, such as calcium hydroxide in lime milk, calcium hydroxide in the aged mortar and C—S—H gel, and the previously generated calcium carbonate particulates were served as nucleating points to generate strength substances such as calcium carbonate and silica gel, so that the particulate calcium carbonate continuously developed to gradually fill the pores and micro-cracks to make the microstructure of the aged mortar on the surface of recycled aggregate more compact, thereby improving the performance of recycled aggregate.

In general, under the condition that the components of bittern and lime milk were unchanged, the longer the total time of spray pretreatment, the better the reinforcing effect of recycled aggregate within the scope of the solution given by the present disclosure. This was because the longer pretreatment time could make the reaction of producing effective substance calcium chloride dihydrate more sufficient, so that more abundant particulate calcium carbonate was produced to fill the pores and micro-cracks of the aged mortar on the surface layer of recycled aggregate during carbonization reinforcing.

Therefore, in practical applications, if it was necessary to shorten the total time of spray pretreatment, it was also possible to reduce the time interval between spray treatments by appropriately increasing the number of spray treatments in spray pretreatment while reducing the water output of each spray treatment, and appropriately reducing the volume ratio of bittern and lime milk in each spray treatment, so that bittern and lime milk permeated more fully the pores and micro-cracks of the aged mortar on the surface layer of the recycled aggregate, and the concentration of calcium hydroxide was increased to reduce the influence of the reduction of the total time of spray pretreatment on the performance of reinforced recycled aggregate.

As could be seen from Example 1 and Comparative Example 2 in Table 1, in the spray pretreatment step using the reinforced recycled aggregate of the present disclosure, if the time interval of spray treatments was less than the range provided by the present disclosure, the reinforcing effect was greatly reduced. This was because the time interval between two spray treatments was too short, resulting in the formation of calcium carbonate coating on the surface of recycled aggregate to prevent the subsequent sprayed bittern and lime milk from continuing to permeate the pores and micro-cracks of the aged mortar on the surface layer of the recycled aggregate.

As could be seen from Example 2 and Comparative Example 3 in Table 1, in the spray pretreatment step using the reinforced recycled aggregate of the present disclosure, if the number of spray treatments exceeded the range provided by the present disclosure, or the total time of the spray pretreatment step exceeded the range provided by the present disclosure, the reinforcing effect would not be significantly improved. This was because the surface layer and some deep pores and micro-cracks of the aged mortar on the surface of recycled aggregate were gradually completely filled after spray pretreatment for a period of time, which made it difficult for bittern and lime milk to continue to permeate and the speed of generating strength substances gradually slowed down.

As could be seen from Example 3 and Comparative Example 4 in Table 1, in the spray pretreatment step using the reinforced recycled aggregate of the present disclosure, if the number of spray treatments was less than the range provided by the present disclosure, the reinforcing effect was greatly reduced. This was because the number of spray treatments was too small, resulting in the excessive spraying amount of bittern and lime milk in each spray treatment, the calcium carbonate coating was formed on the surface of recycled aggregate, and the subsequent spraying of bittern and lime milk was prevented from continuing to permeate the pores and micro-cracks of the aged mortar on the surface layer of recycled aggregate.

As could be seen from Examples 1 and 3 and Comparative Examples 5 and 6 in Table 1, in practical applications using the reinforced recycled aggregate of the present disclosure, a carbonization time could be shortened by appropriately increasing the volume fraction of carbon dioxide in the carbon dioxide-containing gas. However, when the recycled aggregate was reinforced by a gas with a carbon dioxide concentration exceeding the range provided by the present disclosure, the reinforcing effect was reduced instead of being improved. When the recycled aggregate was reinforced by a gas with a carbon dioxide concentration lower than the range provided by the present disclosure, in order to ensure the performance of the reinforced recycled aggregate, the carbonization time was greatly prolonged and the reinforcing effect was very limited in a short time. This was because when the concentration of carbon dioxide was higher in the carbonization reinforcing process, a concentration of bicarbonate ions in the solution of the pores and micro-cracks of the aged mortar on the surface layer of recycled aggregate was higher, which could generate more abundant particulate calcium carbonate to provide nucleating points and the speed of generating strength substances through a chemical reaction was faster. However, the solubility of carbon dioxide was limited, resulting in the limited increase of carbonate ions and bicarbonate ions in the pores and micro-cracks of the aged mortar when the volume fraction of carbon dioxide in the gas was further increased. Moreover, too high carbon dioxide concentration was not conducive to the formation of particulate calcium carbonate, and large-diameter calcium carbonate whiskers were easily generated, and the pores and micro-cracks in the surface layer of the aged mortar were blocked, resulting in poor reinforcing effect of the deep structure of aged mortar. When the concentration of carbon dioxide was low, the appropriate prolonging of carbonization time could make carbon dioxide react more fully with effective components such as calcium hydroxide in lime milk, calcium hydroxide in the aged mortar and C—S—H gel. When the concentration of carbon dioxide was too low, in addition to the carbonization time being greatly prolonged, the formation and development of particulate calcium carbonate would be affected, so it was difficult to ensure the reinforcing effect.

As could be seen from Examples 1-3 and Comparative Example 7 in Table 1, compared with the accelerated carbonization reinforced recycled aggregate with better reinforcing effect in the available information, the reinforced recycled aggregate prepared in the present disclosure had a significantly better effect on improving the apparent density, a relatively better effect on reducing the water absorption, and a similar effect on reducing the crushing value. By using the reinforced recycled aggregate of the present disclosure, compared with the accelerated carbonization reinforced recycled aggregate method, the performance of recycled aggregate could be improved more effectively at normal temperature and pressure, a short time and a low treatment level of directly utilizing waste gas containing a low concentration of carbon dioxide.

The invention claimed is:

1. A method for preparing bittern-carbonization synergistic reinforced recycled aggregate, comprising the following steps:
  (1) performing alternate spraying on recycled aggregate with bittern and lime milk at intervals for many times at 4-70° C. and a pressure of 0.05-0.6 MPa until a surface of the recycled aggregate is wet;
  (2) introducing waste gas containing carbon dioxide for a retention time of 4-8 h after the recycled aggregate is allowed to stand for 2-4 h, a volume fraction of carbon dioxide in the waste gas being 10-20%; and
  (3) removing soluble impurities on the surface of the recycled aggregate by rinsing in water, and performing air-drying on the recycled aggregate to obtain bittern-carbonization synergistic reinforced recycled aggregate.

2. The method for preparing bittern-carbonization synergistic reinforced recycled aggregate according to claim 1, wherein in step (1), the recycled aggregate is a low-quality recycled coarse aggregate with a water-cement ratio of primary concrete of 0.3-0.45 and a particle size of 5-20 mm.

3. The method for preparing bittern-carbonization synergistic reinforced recycled aggregate according to claim 1, wherein in step (1), a concentration of magnesium ions in bittern is ≥2.3 mol/L.

4. The method for preparing bittern-carbonization synergistic reinforced recycled aggregate according to claim 3, wherein in step (1), a concentration of magnesium ions in bittern is 2.9-3.5 mol/L.

5. The method for preparing bittern-carbonization synergistic reinforced recycled aggregate according to claim 1, wherein in step (1), the lime milk is a calcium hydroxide suspension, a mass percentage of calcium hydroxide being 40%-60%.

6. The method for preparing bittern-carbonization synergistic reinforced recycled aggregate according to claim 1, wherein in step (1), a volume ratio of bittern to lime milk is 25:1-35:1, and the lime milk is sprayed at intervals of 10-30 min after the bittern is sprayed every time.

7. The method for preparing bittern-carbonization synergistic reinforced recycled aggregate according to claim 1, wherein in step (1), the alternate spraying is performed at intervals of 1-4 h for 2-4 times.

8. The method for preparing bittern-carbonization synergistic reinforced recycled aggregate according to claim 1, wherein in step (2), a volume fraction of carbon dioxide in the waste gas is 15-20%.

9. The method for preparing bittern-carbonization synergistic reinforced recycled aggregate according to claim 1, wherein in step (3), the rinsing is performed for 30 min-1 h.

* * * * *